US012640117B2

(12) United States Patent
Zhang

(10) Patent No.: US 12,640,117 B2
(45) Date of Patent: May 26, 2026

(54) DISPLAY CONTROL METHOD, APPARATUS, AND STORAGE MEDIUM

(71) Applicant: Lenovo (Beijing) Limited, Beijing (CN)

(72) Inventor: Guobin Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 19/000,669

(22) Filed: Dec. 23, 2024

(65) Prior Publication Data

US 2025/0218414 A1 Jul. 3, 2025

(30) Foreign Application Priority Data

Dec. 29, 2023 (CN) ........................ 202311869172.8

(51) Int. Cl.
*G09G 5/10* (2006.01)

(52) U.S. Cl.
CPC ....... *G09G 5/10* (2013.01); *G09G 2320/0626* (2013.01); *G09G 2330/021* (2013.01); *G09G 2340/0435* (2013.01); *G09G 2360/16* (2013.01)

(58) Field of Classification Search
CPC ............ G09G 5/10; G09G 2320/0626; G09G 2330/021; G09G 2340/0435; G09G 2360/16; G09G 3/20
See application file for complete search history.

(56) References Cited

U.S. PATENT DOCUMENTS

| | | | | |
|---|---|---|---|---|
| 9,501,993 | B2 * | 11/2016 | Nambi | G09G 3/36 |
| 2022/0114956 | A1 * | 4/2022 | Lee | G09G 5/00 |
| 2025/0252899 | A1 * | 8/2025 | Lee | G09G 3/32 |

* cited by examiner

*Primary Examiner* — Rodney Amadiz
(74) *Attorney, Agent, or Firm* — ANOVA LAW GROUP, PLLC

(57) ABSTRACT

A control method includes determining a target brightness of a screen, in response to the target brightness being within a target brightness interval, determining a target refresh rate range corresponding to the target brightness interval, and based on the at least two refresh rates included in the target refresh rate range, responding to dynamic refresh rate adjustment when the screen is under the target brightness. A whole brightness range supported by the screen corresponds to at least two brightness intervals. Each brightness interval of the at least two brightness intervals corresponds to a refresh rate range in a one-to-one correspondence, and the refresh rate range includes at least two refresh rates.

17 Claims, 2 Drawing Sheets

DISPLAY CONTROL METHOD, APPARATUS, AND STORAGE MEDIUM

CROSS-REFERENCE TO RELATED APPLICATION

The present disclosure claims priority to Chinese Patent Application No. 202311869172.8, filed on Dec. 29, 2023, the entire content of which is incorporated herein by reference.

TECHNICAL FIELD

The present disclosure is related to the data processing technology field and, more particularly, to a control method, a control apparatus, and a storage medium.

BACKGROUND

When displaying an image, the screen of an electronic device refreshes the display content. A screen refresh rate refers to the number of times the screen scans and displays the display content in a predetermined direction. When the refresh rate is higher, displaying of the image is smoother. However, the power consumption of the electronic device is increased. If the display content of the screen is refreshed with a fixed screed refresh rate, the user experience under a certain scenario is impaired.

SUMMARY

One aspect of the present disclosure provides a control method. The method includes determining a target brightness of a screen, in response to the target brightness being within a target brightness interval, determining a target refresh rate range corresponding to the target brightness interval, and based on the at least two refresh rates included in the target refresh rate range, responding to dynamic refresh rate adjustment when the screen is under the target brightness. A whole brightness range supported by the screen corresponds to at least two brightness intervals. Each brightness interval of the at least two brightness intervals corresponds to a refresh rate range in a one-to-one correspondence, and the refresh rate range includes at least two refresh rates.

Another aspect of the present disclosure provides a control apparatus, including a first determination unit, a second determination unit, and a response unit. The first determination unit is configured to determine a target brightness of a screen. A whole brightness range supported by the screen corresponds to at least two brightness intervals. A second determination unit is configured to, in response to the target brightness being within a target brightness interval, determine a target refresh rate range corresponding to the target brightness interval. Each brightness interval of the at least two brightness intervals corresponds to a refresh rate range in a one-to-one correspondence. The refresh rate range includes at least two refresh rates. The response unit is configured to, based on the at least two refresh rates included in the target refresh rate range, respond to dynamic refresh rate adjustment when the screen is under the target brightness.

Another aspect of the present disclosure provides a non-transitory computer-readable storage medium storing a computer program that, when executed by one or more processors, causes the one or more processors to determine a target brightness of a screen, in response to the target brightness being within a target brightness interval, determine a target refresh rate range corresponding to the target brightness interval, and based on the at least two refresh rates included in the target refresh rate range, respond to dynamic refresh rate adjustment when the screen is under the target brightness. A whole brightness range supported by the screen corresponds to at least two brightness intervals. Each brightness interval of the at least two brightness intervals corresponds to a refresh rate range in a one-to-one correspondence. The refresh rate range includes at least two refresh rates.

DETAILED DESCRIPTION OF THE EMBODIMENTS

The technical solutions of embodiments of the present disclosure are described below in detail in conjunction with the accompanying drawings of embodiments of the present disclosure. Apparently, the described embodiments are merely some embodiments of the present disclosure, not all embodiments. Based on embodiments of the present disclosure, all other embodiments obtained by those of ordinary skills in the art without creative efforts are within the scope of the present disclosure.

The terms "first" and "second" in the specification, claims, and accompanying drawings of the present disclosure are used to distinguish different objects instead of describing a certain order. The terms "include," "comprise," and any variations thereof are intended to cover non-exclusive inclusion. For example, a process, method, system, product, or device including a series of steps or units is not restricted to the steps or units listed but can also include steps or units not listed.

Embodiments of the present disclosure provide a control method applied to an electronic device having a screen to dynamically adjust the refresh rate of the screen in a target brightness. Thus, the display effect of the screen can be ensured, and the power consumption of the device can be lowered.

To better understand embodiments of the present disclosure, the terms or concepts involved in the embodiments are explained as follows.

Screen refresh rate refers to a refresh rate of a screen of an electronic device, also known as hardware refresh rate, abbreviated here as refresh rate, with units in Hertz (Hz).

Screen brightness, i.e., backlight brightness, is a physical quantity indicating intensity of screen light of an electronic device.

Figure 1:
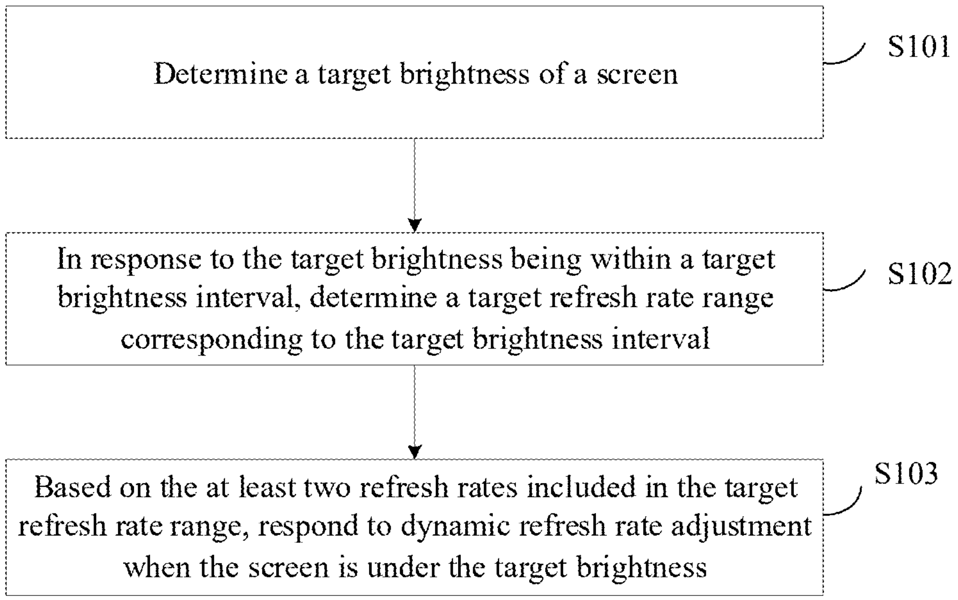
FIG. 1 illustrates a schematic flowchart of a control method according to some embodiments of the present disclosure.

FIG. 1 illustrates a schematic flowchart of a control method according to some embodiments of the present disclosure. The method includes the following steps.

At S101, a target brightness of a screen is determined.

The target brightness of the screen can be the current brightness of the screen of the electronic device, a screen brightness currently selected by a user, or a brightness parameter configured by default corresponding to the display information that is to be displayed by the screen. The target brightness can also be a brightness determined based on ambient brightness. The brightness range supported by the screen can correspond to at least two brightness intervals. That is, the screen brightness can be divided into at least two brightness intervals according to an adjustable maximum value and an adjustable minimum value of the screen brightness. Each brightness interval can correspond to different screen brightness levels. For example, a medium value of the screen brightness can be determined based on the adjustable maximum value and the adjustable minimum value of the screen brightness. The brightness interval from the minimum value to the medium value can be determined as a low brightness interval. The brightness interval from the medium value to the maximum value can be determined as a high brightness interval. Each brightness interval can correspond to different screen brightness values.

At S102, if the target brightness belongs to a target brightness interval, a target refresh rate range corresponding to the target brightness interval is determined.

Based on the brightness parameter range of each brightness interval and the parameter value of the current target brightness, the target brightness interval to which the target brightness belongs can be determined. Each brightness interval of the two brightness intervals can correspond to a refresh rate range in a one-to-one correspondence. Each refresh rate range can include at least two refresh rates. For example, the brightness interval can include a first brightness interval, a second brightness interval, and a third brightness interval. The first brightness interval can correspond to a first refresh rate range, the second brightness interval can correspond to a second refresh rate range, and the third brightness interval can correspond to a third refresh rate range. Each refresh rate range can include at least two refresh rates. In some embodiments, each refresh rate range can include a plurality of refresh rates. For example, the first refresh rate range can be 25 Hz-50 Hz.

The refresh rate range corresponding to each brightness interval can be determined by refresh rate switching tests. For example, the refresh rate can be switched among all refresh rates in the first brightness interval, and a display effect parameter of the screen can be then obtained. A refresh rate not causing differences in the display effect can be determined as the first refresh rate range corresponding to the first brightness interval. Further, when the refresh rate is dynamically adjusted for each brightness of the first brightness interval in the first refresh rate range, the display effect of the screen can be the same under the brightness or have a difference in a small range. That is, the display information may not stutter or lag.

At S103, based on the at least two refresh rates included in the target refresh rate range, the dynamic refresh rate adjustment is responded to when the screen is under the target brightness.

Adjust the refresh rate dynamically at the target brightness based on at least two refresh rates included in the target refresh rate range. In some embodiments, a corresponding refresh rate can be determined based on the information mode of the display information of the current screen to refresh the display content of the screen. For example, under the target brightness of the screen, if the screen displays a static image, a small refresh rate can be selected in the target refresh rate range. Thus, the screen can display a static image based on the small refresh rate. Correspondingly, when the display content of the screen is switched from a static image into a dynamic image, a large refresh rate can be selected in the target refresh rate range to allow the screen to display the dynamic image based on the large refresh rate. The target refresh rate can be determined in the target refresh rate range based on the current power consumption of the device or the performance requirements of the user for the device.

In the control method of embodiments of the present disclosure, a corresponding refresh rate range can be determined for each brightness interval. When the refresh rate can be dynamically adjusted within the refresh rate range. The display effect of the screen may not be affected. Thus, the screen may not need to be fixed to a certain refresh rate under a certain brightness interval, which prevents the poor display effect with the fixed refresh rate when the display content of the screen changes or the state of the device changes under a certain brightness of the screen.

For example, in a general processing mode of a cell phone, under a low brightness interval of the cell phone, a fixed refresh rate can be used to address the poor user experience due to display effect differences. Since the performance of the device also needs to be considered in the low brightness, a relatively high refresh rate may need to be fixed. Thus, a low frame rate may be lost or the possibility of switching the static scenario to the low refresh rate may be lost, which can increase the power consumption of the device. In the control method of embodiments of the present disclosure, the refresh rate can be dynamically adjusted in the corresponding target refresh rate range under each brightness interval. For example, when the screen displays a static image, with the low refresh rate, the user experience can be improved while the power consumption of the device can be reduced.

In some embodiments, the target brightness interval can be a second brightness interval of the at least two brightness intervals. The minimum value of the second brightness interval can be the minimum value of the brightness range supported by the screen. The numbers of refresh rates included in the second refresh rate range corresponding to the second brightness range can be smaller than the number of refresh rates included in the first refresh rate range corresponding to the first brightness interval.

The screen brightness can be divided into at least two brightness intervals according to the maximum value and the minimum value for the adjustable screen brightness. Correspondingly, the second brightness interval can be an interval from the minimum value of the brightness supported by the screen to the target brightness threshold. The target brightness threshold can be the medium value between the adjustable maximum value and the minimum value of the screen brightness. For example, the second brightness interval can be the low brightness interval of the screen. The second brightness interval can correspond to the second refresh rate range. Based on the refresh rates in the second refresh rate range, the dynamic refresh rate adjustment when the screen in the target brightness in the second brightness range can be responded to. Based on the refresh rate in the second refresh rate range, when the corresponding display content is displayed, no display effect difference can be generated. Thus, not all the refresh rates supported by the electronic device can satisfy the condition of not generating display effect differences. The first brightness interval can be from the target brightness threshold to the maximum value of the brightness range supported by the screen, which can be referred to as a high brightness interval. The refresh rate range corresponding to the high brightness interval can include all refresh rates between the minimal refresh rate and the maximum refresh rate supported by the electronic device. To ensure that the refresh rate in the second refresh rate range can satisfy the condition of not generating the display effect difference, not all the fresh rates in the first refresh rate range can be applied to the second refresh rate range. Thus, the number of the refresh rates included in the second refresh rate range can be smaller than the number of the refresh rates included in the first refresh rate range corresponding to the first brightness interval. For example, the first refresh rate range can include 5 refresh rates, and the second refresh rate range can include three refresh rates. Thus, in the low brightness interval, the refresh rate may not need to be fixed at a relatively high refresh rate. Thus, the performance of the device can be improved, while the power consumption of the device can be saved, which further improves the user experience.

In some embodiments, the method can further include obtaining a real-time frame of a target application, determining the target refresh rate corresponding to the real-time frame from the target refresh rate range based on the real-time frame, and displaying the display content corresponding to the target application based on the target refresh rate when the screen is in the target brightness.

In some embodiments, the target application can be a program providing the display information to the screen of the electronic device. For example, the target application can be a browser or a video client. The real-time frame of the target application can be the current operation frequency of the target application. That is, the frame can be referred to as a software refresh rate, which is the actual operation frequency of the system synthesizer and the system application. The frame rate can be the frequency (rate) of bitmap images continuously appearing on the screen with a frame as a unit.

To satisfy the real-time frame rate, i.e., to cause the display information output to the screen to be smoother, the refresh rate can be matched with the real-time frame rate. Then, the target refresh rate corresponding to the real-time frame rate can be determined from the target refresh rate range based on the real-time frame rate. When the screen is in the target brightness, the display content corresponding to the target application can be displayed based on the target refresh rate. The display content can be the display interface of the target application or to-be-displayed information loaded by the target application. For example, the target application can be a video program. The display content can be a video file that needs to be displayed on the screen loaded by the video application.

Further, if the real-time frame rate of the target application changes, the at least two refresh rates included in the target refresh rate range can support the change in the target refresh rate.

For example, when the target application corresponds to different display contents, different frame rates can be configured. When the display content loaded by the target application changes, the real-time frame rate of the target application can change too. To cause the display content output by the target application to be smoother during the display, the target refresh rate may also need to be adjusted to the refresh rate corresponding to the current real-time frame rate. For example, the real-time frame rate of the target application at the first moment can be A, and the corresponding target refresh rate can be a. When the real-time frame rate of the target application at the second moment changes to B, the target refresh rate can be b.

Thus, under the target brightness, the target refresh rate can be determined in the target refresh rate range based on the real-time frame rate of the target application. When the real-time frame rate changes, the target refresh rate can change too, which can improve the output effect of the display content of the target application.

In embodiments of the present disclosure, determining the target refresh rate corresponding to the real-time frame rate from the target refresh rate range based on the real-time frame rate can include if the real-time frame rate is configured with a first refresh rate, and the first refresh rate exists in the target refresh rate range, determining the first refresh rate as the target refresh rate corresponding to the real-time frame rate.

In some embodiments, when the first refresh rate that matches the image output effect of the real-time frame rate exists, search can be performed in the target refresh rate range. If the first refresh rate also exists in the target refresh rate range, the first refresh rate can be used as the target refresh rate.

Correspondingly, if the real-time frame rate is configured with a second refresh rate, and the second refresh rate does not exist in the target refresh rate range, a refresh rate in the target refresh rate range that matches the target matching condition with the second refresh rate can be determined as the target refresh rate corresponding to the real-time frame rate.

In some embodiments, the target matching condition can mean that a refresh rate closest to the second refresh rate exists in the target refresh rate range. For example, a refresh rate difference range can be 0 to 10 Hz. If the second refresh rate is 65 Hz, and the target refresh rate range does not include 65 Hz but includes 70 Hz and 90 Hz, 70 Hz can be then used as the target refresh rate.

Further, if each of the refresh rates of the target refresh rate range has a relatively large difference from the second refresh rate, a fixed refresh rate can be determined based on requirement information as the target refresh rate. The requirement information can be power consumption requirement, battery life requirement, or display performance requirement for the device. For example, if the electronic device has currently low remaining power, a relatively small refresh rate can be configured as the target refresh rate to ensure the battery life requirement for the electronic device.

In embodiments of the present disclosure, the method can further include obtaining a system refresh rate range of a device system where the screen is located, and if the system refresh rate does not overlap with the target refresh rate range, determining the target refresh rate corresponding to the target brightness based on the requirement information.

The device system where the screen is located can be an operating system of the electronic device or a processing system supporting the display data output. If the system refresh rate range overlaps the target refresh rate range, the refresh rate range corresponding to the overlap can be determined as the refresh rate range corresponding to the target brightness interval. That is, the target refresh rate corresponding to the target brightness can be determined in the refresh rate range. If the system refresh rate range does not overlap with the target refresh rate range, the target refresh rate corresponding to the target brightness can be determined based on the requirement information. The requirement information can be the power consumption requirement, battery life requirement, or display performance requirement for the device. For example, when the electronic device has a relatively high power consumption, a relatively small refresh rate can be configured as the target refresh rate to reduce the power consumption of the electronic device.

Further, the requirement information can be determined based on the remaining battery life of the device. Determining the target refresh rate corresponding to the target brightness based on the requirement information can include, in response to the remaining battery life of the device being in a first battery life range, determining the target refresh rate corresponding to the target brightness as a third refresh rate, in response to the remaining battery life of the device being in the second battery life range and determining the target refresh rate corresponding to the target brightness as a fourth refresh rate.

The remaining battery life of the device in the first battery life range can be greater than the remaining battery life of the device in the second battery life range. The third refresh rate can be greater than the fourth refresh rate.

In some embodiments, if the current remaining battery life of the electronic device is relatively high, a relatively high refresh rate can be determined as the target refresh rate. If the current remaining battery life of the electronic device is relatively low, a relatively low refresh rate can be determined as the target refresh rate. Thus, the performance and the battery life of the electronic device can be ensured.

In embodiments of the present disclosure, the control method is described in an application scenario.

Based on the adjustable brightness range of the screen of the electronic device, division can be performed to obtain at least two brightness intervals. Then, switching test can be performed on all the refresh rates. The refresh rates, which do not generate effect difference during the switching test, can be grouped to obtain a refresh rate range corresponding to the brightness interval.

When the current brightness of the screen of the electronic device is in the target brightness interval, an overlap between the current system refresh rate interval of the electronic device and the target refresh rate range corresponding to the target brightness interval can be extracted, and the refresh rate matching the current scenario can be calculated. For example, according to the current operation mode, load status, and power of the electronic device, a group including the refresh rate having no effect difference when being switched in the current refresh rate range can be used as the current target refresh rate group. If the current system refresh rate interval and the target refresh rate range do not overlap, a value can be selected from the refresh rate range supported by the electronic device as the fixed refresh rate. In some embodiments, the fixed refresh rate can be determined according to the requirement information. For example, the fixed refresh rate can be determined according to the remaining power of the electronic device.

When an external application calls an interface to change the refresh rate range, an overlap with the refresh rate range of the current screen brightness can be extracted. If the overlap exists, the overlap can be used as the refresh rate range of the current screen brightness. If no overlap exists, a value can be selected from the refresh rate range supported by the electronic device as the fixed refresh rate. In some embodiments, the fixed refresh rate can be determined according to the requirement information. For example, the fixed refresh rate can be determined according to the battery remaining power of the electronic device. Further, if the fixed refresh rate is configured externally through the calling interface, the refresh rate can be switched to the fixed refresh rate.

Figure 2:
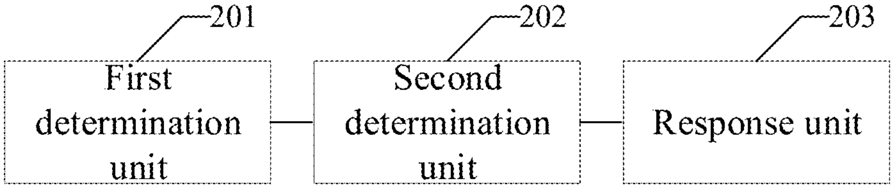
FIG. 2 illustrates a schematic structural diagram of a control apparatus according to some embodiments of the present disclosure.

FIG. 2 illustrates a schematic structural diagram of a control apparatus according to some embodiments of the present disclosure. The apparatus includes a first determination unit 201, a second determination unit 202, and a response unit 203.

The first determination unit 201 can be configured to determine the target brightness of the screen. The whole brightness range supported by the screen can correspond to at least two brightness intervals.

The second determination unit 202 can be configured to, if the target brightness belongs to the target brightness interval, determining the target refresh rate range corresponding to the target brightness range. Each brightness interval of the at least two brightness intervals can correspond to a refresh rate range in a one-to-one correspondence. Each refresh rate range can include at least two refresh rates.

The response unit 203 can be configured to, based on the at least two refresh rates included in the target refresh rate range, respond to the dynamic refresh rate adjustment when the screen is in the target brightness.

In some embodiments, the target brightness interval can be the second brightness interval of the at least two brightness intervals. The minimum value of the second brightness interval can be the minimum value of the brightness range supported by the screen. The number of the refresh rates included in the second refresh rate range corresponding to the second brightness interval can be smaller than the number of refresh rates included in the first refresh rate range corresponding to the first brightness interval.

In some embodiments, the apparatus can further include a first acquisition unit, a third determination unit, and a display unit.

The first acquisition unit can be configured to obtain the real-time frame rate of the target application.

The third determination unit can be configured to determine the target refresh rate corresponding to the real-time frame rate from the target refresh rate range based on the real-time frame rate.

The display unit can be configured to, when the screen is in the target brightness, display the display content corresponding to the target application based on the target refresh rate.

In some embodiments, if the real-time frame rate of the target application changes, the at least two refresh rates included in the target refresh rate range can support the change in the target refresh rate.

In some embodiments, the third determination unit can include a first determination sub-unit. The first determination sub-unit can be configured to, if the real-time frame rate is configured with a first refresh rate, and the target refresh rate range includes the first refresh rate, determine the first refresh rate as the target refresh rate corresponding to the real-time frame rate.

In some embodiments, the third determination unit can include a second determination sub-unit. The second determination sub-unit can be configured to, if the real-time frame rate is configured with a second refresh rate, and the target refresh rate range does not include the second refresh rate, determining a refresh rate from the target refresh rate range matching a target matching condition with the second refresh rate as the target refresh rate corresponding to the real-time frame rate.

In some embodiments, the apparatus can further include a second acquisition unit and a fourth acquisition unit.

The second acquisition unit can be configured to obtain the system refresh rate range of the device system where the screen is located.

The fourth acquisition unit can be configured to, if the system refresh rate range does not overlap with the target refresh rate range, determine the target refresh rate corresponding to the target brightness based on the requirement information.

In some embodiments, the requirement information can be determined based on the device remaining power. The fourth determination unit can be configured to, if the device remaining power is in the first power range, determine the target refresh rate corresponding to the target brightness as the third refresh rate, and if the device remaining power is in the second power range, determine the target refresh rate corresponding to the target brightness as the fourth refresh rate.

The device remaining power in the first power range can be greater than the device remaining power in the second power. The third refresh rate can be greater than the fourth refresh rate.

For the units and unit embodiments of the present disclosure, reference can be made to the corresponding contents above, which is not described in detail here.

In some other embodiments, a storage medium can be provided. The storage medium stores a computer software that, when executed by one or more processors, causes the one or more processors to determine the target brightness of the screen, the whole brightness range supported by the screen corresponding to the two at least two brightness intervals, and determine the target refresh rate range corresponding to the target brightness interval if the target brightness belongs to the target brightness interval. Each brightness interval of the at least two brightness intervals can correspond to a refresh rate range in a one-to-one correspondence. Each refresh rate range can at least include two refresh rates. The one or more processors can be further configured to, based on the at least two refresh rates included in the target refresh rate range, respond to the dynamic refresh rate adjustment when the screen is under the target brightness.

Figure 3:
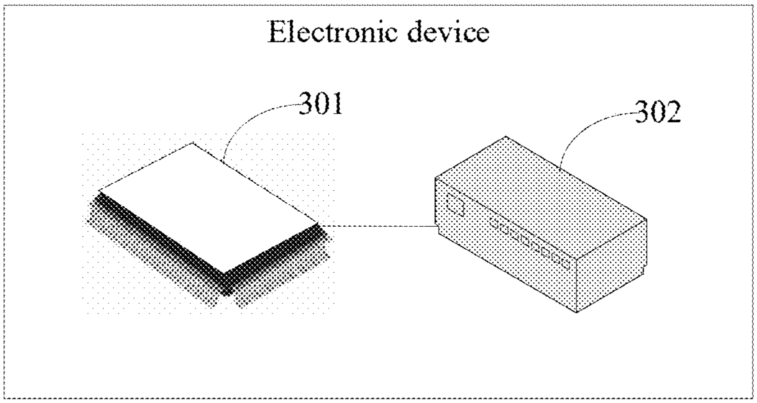
FIG. 3 illustrates a schematic structural diagram of an electronic device according to some embodiments of the present disclosure.

Some other embodiments of the present disclosure further provide an electronic device. As shown in FIG. 3, the electronic device includes one or more memories 301 and one or more processors 302.

The one or more memories 301 can be used to store the application and data generated when the application is running.

The one or more processors 302 can be configured to execute the application to realize a control method. The control method can include determining the target brightness of the screen, the whole brightness range supported by the screen corresponding to the two at least two brightness intervals, and determining the target refresh rate range corresponding to the target brightness interval if the target brightness belongs to the target brightness interval. Each brightness interval of the at least two brightness intervals can correspond to a refresh rate range in a one-to-one correspondence. Each refresh rate range can at least include two refresh rates. The method can further include, based on the at least two refresh rates included in the target refresh rate range, responding to the dynamic refresh rate adjustment when the screen is under the target brightness.

In some embodiments, the target brightness interval can be the second brightness interval of the at least two brightness intervals. The minimum value of the second brightness interval can be the minimal value of the brightness range supported by the screen.

The number of the refresh rates included in the second refresh rate range corresponding to the second brightness interval can be smaller than the number of the refresh rates included in the first refresh rate range corresponding to the first brightness interval.

The method can further include obtaining the real-time frame rate of the target application, determining the target refresh rate corresponding to the real-time frame rate from the target refresh rate range based on the real-time frame rate, and when the screen is under the target brightness, display the display content corresponding to the target application based on the target refresh rate.

In some embodiments, if the real-time frame rate of the target application changes, the at least two refresh rates included in the target refresh rate range can support the change in the target refresh rate.

In some embodiments, determining the target refresh rate corresponding to the real-time frame rate from the target refresh rate range based on the real-time frame rate can include, if the real-time frame rate is configured with the first refresh rate, and the target refresh rate range includes the first refresh rate, determining the first refresh rate as the target refresh rate corresponding to the real-time frame rate.

In some embodiments, determining the target refresh rate corresponding to the real-time frame rate from the target refresh rate range based on the real-time frame rate can include, if the real-time frame rate is configured with the second refresh rate, and the target refresh rate range does not include the second refresh rate, determining the refresh rate satisfying the target matching condition with the second refresh rate of the target refresh rate range as the target refresh rate corresponding to the real-time frame rate.

In some embodiments, the method can further include obtaining the system refresh rate range of the device system where the screen is located, and if the system refresh rate range does not overlap with the target refresh rate range, determining the target refresh rate corresponding to the target brightness based on the requirement information.

In some embodiments, the requirement information can be determined based on the device remaining power. Determining the target refresh rate corresponding to the target brightness based on the requirement information can include, if the device remaining power is in the first power range, determining the target refresh rate corresponding to the target brightness as the third refresh rate, and if the device remaining power is in the second power range, determining the target refresh rate corresponding to the target brightness as the fourth refresh rate. The device remaining power in the first power range can be greater than the device remaining power in the second power range. The third refresh rate can be greater than the fourth refresh rate.

For the implementation of the processor of embodiments of the present disclosure, reference can be made to the corresponding content above, which is not described in detail.

Embodiments of the present disclosure are described in a progressive manner. Each embodiment focuses on the difference from another embodiment. Similar or identical parts among embodiments can refer to each other. For the apparatus of embodiments of the present disclosure, since apparatus embodiments correspond to method embodiments of the present disclosure, the apparatus is described as relatively simple. For relevant parts, reference can be made to the method description.

Those skilled in the art can further understand that units and algorithm steps described in connection with embodiments of the present disclosure can be implemented by electronic hardware, computer software, or a combination thereof. To describe the interchangeability between the hardware and the software, the compositions and steps of embodiments are described according to the general functionality. Whether the function is performed by hardware or software depends on the specific application and the design restriction condition of the technical solution. Those skilled in the art can implement the described function by using different methods for each specific application. However, the implementation should not be considered as exceeding the scope of the present disclosure.

The steps of the methods or algorithms described in embodiments of the present disclosure can be implemented by the hardware, the software module executed by the processor, or a combination thereof. The software module can be stored in random-access memory (RAM), memory, read-only memory (ROM), electrically programmable ROM, electrically erasable programmable ROM, registers, hard disks, removable disks, CD-ROMs, or any other form of storage medium known in the art.

The above description of the above embodiments enables those skilled in the art to implement or use the present disclosure. Various modifications of the embodiments are apparent to those skilled in the art. The general principle defined herein may be implemented in other embodiments without departing from the spirit or scope of the present disclosure. Therefore, the present disclosure is not limited to the embodiments above but should conform to the widest scope consistent with the principle and novel features of documents of the present disclosure.

What is claimed is:

1. A control method comprising:

determining a target brightness of a screen, a whole brightness range supported by the screen corresponding to at least two brightness intervals;

in response to the target brightness being within a target brightness interval, determining a target refresh rate range of the screen corresponding to the target brightness interval, each brightness interval of the at least two brightness intervals corresponding to a refresh rate range in a one-to-one correspondence, and the refresh rate range including at least two refresh rates;

based on the at least two refresh rates included in the target refresh rate range, responding to dynamic adjustment on a refresh rate of the screen when the screen is under the target brightness;

obtaining a real-time frame rate of a target application; and determining, from the target refresh rate, a target refresh rate of the screen corresponding to the real-time frame rate of the target application.

2. The control method according to claim 1, wherein:

the target brightness interval is a second brightness interval of the at least two brightness intervals, and a minimum value of the second brightness interval is a minimum value of the brightness range supported by the screen; and a number of refresh rates included in the second refresh rate range corresponding to the second brightness interval is smaller than a number of refresh rates included in a first refresh rate range corresponding to a first brightness interval.

3. The control method according to claim 1, further comprising:

displaying a display content corresponding to the target application based on the target refresh rate when the screen is under the target brightness.

4. The control method according to claim 3, wherein:

in response to a change in the real-time frame rate of the target application, the at least two refresh rates included in the target refresh rate range supports a change in the target refresh rate.

5. The control method according to claim 4, wherein determining the target refresh rate corresponding to the real-time frame rate from the target refresh rate range based on the real-time frame rate includes:

in response to the real-time frame rate being configured with a first refresh rate, and the target refresh rate range including the first refresh rate, determining the first refresh rate as the target refresh rate corresponding to the real-time frame rate.

6. The control method according to claim 4, wherein determining the target refresh rate corresponding to the real-time frame rate from the target refresh rate range based on the real-time frame rate includes:

in response to the real-time frame rate being configured with a second refresh rate, and the target refresh rate range not including the second refresh rate, determining a refresh rate in the target refresh rate range that meets a target matching condition with the second refresh rate as the target refresh rate corresponding to the real-time frame rate.

7. The control method according to claim 1, further comprising:

obtaining a system refresh rate range of a device system where the screen is arranged; and in response to the system refresh rate range not overlapping with the target refresh rate range, determining the target refresh rate corresponding to the target brightness based requirement information.

8. The control method according to claim 7, wherein:

the requirement information is determined based on remaining power of the device; and determining the target refresh rate corresponding to the target brightness based on the requirement information includes:

in response to the remaining power of the device being in a first power range, determining the target refresh rate corresponding to the target brightness as a third refresh rate; and in response to the remaining power of the device being within a second power range, determining the target refresh rate corresponding to the target brightness as a fourth refresh rate;

wherein the remaining power of the device in the first power range is greater than the remaining power of the device in the second power range, and the third refresh rate is greater than the fourth refresh rate.

9. A non-transitory computer-readable storage medium storing a computer program that, when executed by one or more processors, causes the one or more processors to:

determine a target brightness of a screen, a whole brightness range supported by the screen corresponding to at least two brightness intervals;

in response to the target brightness being within a target brightness interval, determine a target refresh rate range of the screen corresponding to the target brightness interval, each brightness interval of the at least two brightness intervals corresponding to a refresh rate range in a one-to-one correspondence, and the refresh rate range including at least two refresh rates;

based on the at least two refresh rates included in the target refresh rate range, respond to dynamic adjustment on a refresh rate of the screen when the screen is under the target brightness;

obtain a real-time frame rate of a target application; and determine, from the target refresh rate, a target refresh rate of the screen corresponding to the real-time frame rate of the target application.

10. The computer-readable storage medium according to claim 9, wherein:

the target brightness interval is a second brightness interval of the at least two brightness intervals, and a minimum value of the second brightness interval is a minimum value of the brightness range supported by the screen; and a number of refresh rates included in the second refresh rate range corresponding to the second brightness interval is smaller than a number of refresh rates included in a first refresh rate range corresponding to a first brightness interval.

11. The computer-readable storage medium according to claim 10, wherein the one or more processors are further configured to:

display a display content corresponding to the target application based on the target refresh rate when the screen is under the target brightness.

12. The computer-readable storage medium according to claim 11, wherein:

in response to a change in the real-time frame rate of the target application, the at least two refresh rates included in the target refresh rate range supports a change in the target refresh rate.

13. The computer-readable storage medium according to claim 12, wherein the one or more processors are further configured to:

in response to the real-time frame rate being configured with a first refresh rate, and the target refresh rate range including the first refresh rate, determine the first refresh rate as the target refresh rate corresponding to the real-time frame rate.

14. The computer-readable storage medium according to claim 12, wherein the one or more processors are further configured to:

in response to the real-time frame rate being configured with a second refresh rate, and the target refresh rate range not including the second refresh rate, determine a refresh rate in the target refresh rate range that meets a target matching condition with the second refresh rate as the target refresh rate corresponding to the real-time frame rate.

15. The computer-readable storage medium according to claim 9, wherein the one or more processors are further configured to:

obtain a system refresh rate range of a device system where the screen is arranged; and in response to the system refresh rate range not overlapping with the target refresh rate range, determine the target refresh rate corresponding to the target brightness based requirement information.

16. The computer-readable storage medium according to claim 15, wherein:

the requirement information is determined based on remaining power of the device; and the one or more processors are further configured to:

in response to the remaining power of the device being in a first power range, determining the target refresh rate corresponding to the target brightness as a third refresh rate; and in response to the remaining power of the device being within a second power range, determining the target refresh rate corresponding to the target brightness as a fourth refresh rate;

wherein the remaining power of the device in the first power range is greater than the remaining power of the device in the second power range, and the third refresh rate is greater than the fourth refresh rate.

17. A display control method comprising:

determining a target brightness of a screen, a whole brightness range supported by the screen corresponding to at least two brightness intervals;

in response to the target brightness being within a target brightness interval, determining a target refresh rate range corresponding to the target brightness interval, each brightness interval of the at least two brightness intervals corresponding to a refresh rate range in a one-to-one correspondence, and the refresh rate range including at least two refresh rates;

based on the at least two refresh rates included in the target refresh rate range, responding to dynamic refresh rate adjustment when the screen is under the target brightness;

obtaining a system refresh rate range of a device system where the screen is arranged; and in response to the system refresh rate range not overlapping with the target refresh rate range, determining the target refresh rate corresponding to the target brightness based on requirement information.

* * * * *